United States Patent
Brandt et al.

(10) Patent No.: US 7,259,809 B2
(45) Date of Patent: Aug. 21, 2007

(54) DISPLAY WITH AN ELECTRICALLY CONDUCTING LAYER

(75) Inventors: Peter Brandt, Aschaffenburg (DE); Thomas Brohm, Eppertshausen (DE); Gerhard Wesner, Sulzbach (DE); Michael Zimmermann, Unterafferbach (DE)

(73) Assignee: Siemens Aktiengesellschaft, München (DE)

( * ) Notice: Subject to any disclaimer, the term of this patent is extended or adjusted under 35 U.S.C. 154(b) by 12 days.

(21) Appl. No.: 10/451,441

(22) PCT Filed: Dec. 20, 2001

(86) PCT No.: PCT/DE01/04811

§ 371 (c)(1),
(2), (4) Date: Dec. 4, 2003

(87) PCT Pub. No.: WO02/052495

PCT Pub. Date: Jul. 4, 2002

(65) Prior Publication Data

US 2004/0075786 A1  Apr. 22, 2004

(30) Foreign Application Priority Data

Dec. 23, 2000  (DE)  ............................... 100 64 921

(51) Int. Cl.
*G02F 1/1333*  (2006.01)

(52) U.S. Cl. .................. 349/59; 349/58; 349/149; 361/681; 345/173

(58) Field of Classification Search ............ 349/58–59, 349/149; 361/681; 345/173
See application file for complete search history.

(56) References Cited

U.S. PATENT DOCUMENTS

| 4,781,441 | A | 11/1988 | Kanbe et al. |
|---|---|---|---|
| 5,796,389 | A | 8/1998 | Bertram et al. |
| 6,128,053 | A | 10/2000 | Brandt et al. |
| 6,160,349 | A * | 12/2000 | Nagai .......................... 315/85 |
| 6,476,798 | B1 | 11/2002 | Bertram et al. |
| 6,734,843 | B2 | 5/2004 | Bertram et al. |
| 2001/0038523 | A1 | 11/2001 | Bang |

FOREIGN PATENT DOCUMENTS

| BE | 88 1912 | 6/1980 |
|---|---|---|
| DE | 29 34 503 A1 | 3/1981 |
| DE | 198 48 547 | 5/1999 |
| DE | 198 39 087 | 1/2000 |
| DE | 198 48 010 | 6/2001 |
| JP | 57148722 | 9/1982 |
| JP | 60-114824 | 6/1985 |

(Continued)

OTHER PUBLICATIONS

Translation of Official Letter from the Japanese Patent Office citing the listed references.

*Primary Examiner*—David Nelms
*Assistant Examiner*—(Nancy) Thanh-Nhan Phan Nguyen
(74) *Attorney, Agent, or Firm*—Cohen Pontani Lieberman & Pavane LLP

(57) ABSTRACT

A display for showing text and graphical images includes an electrically conducting layer which is connected to a shield potential, such as a ground potential, for shielding the display from external electromagnetic disturbances and preventing radiation from the display of electromagnetic disturbances generated by the display.

12 Claims, 3 Drawing Sheets

FOREIGN PATENT DOCUMENTS

| | | |
|---|---|---|
| JP | 60-115915 | 6/1985 |
| JP | 60-118823 | 6/1985 |
| JP | 60-119525 | 6/1985 |
| JP | 62-249221 | 10/1987 |
| JP | 03045985 | 2/1991 |
| JP | 5-173153 | 7/1993 |
| JP | 5-196951 | 8/1993 |
| JP | 8-76924 | 3/1996 |
| JP | 10-282896 | 10/1998 |
| JP | 2000-193955 | 7/2000 |
| JP | 2000-284255 | 10/2000 |
| WO | WO 00/43832 | 7/2000 |

* cited by examiner

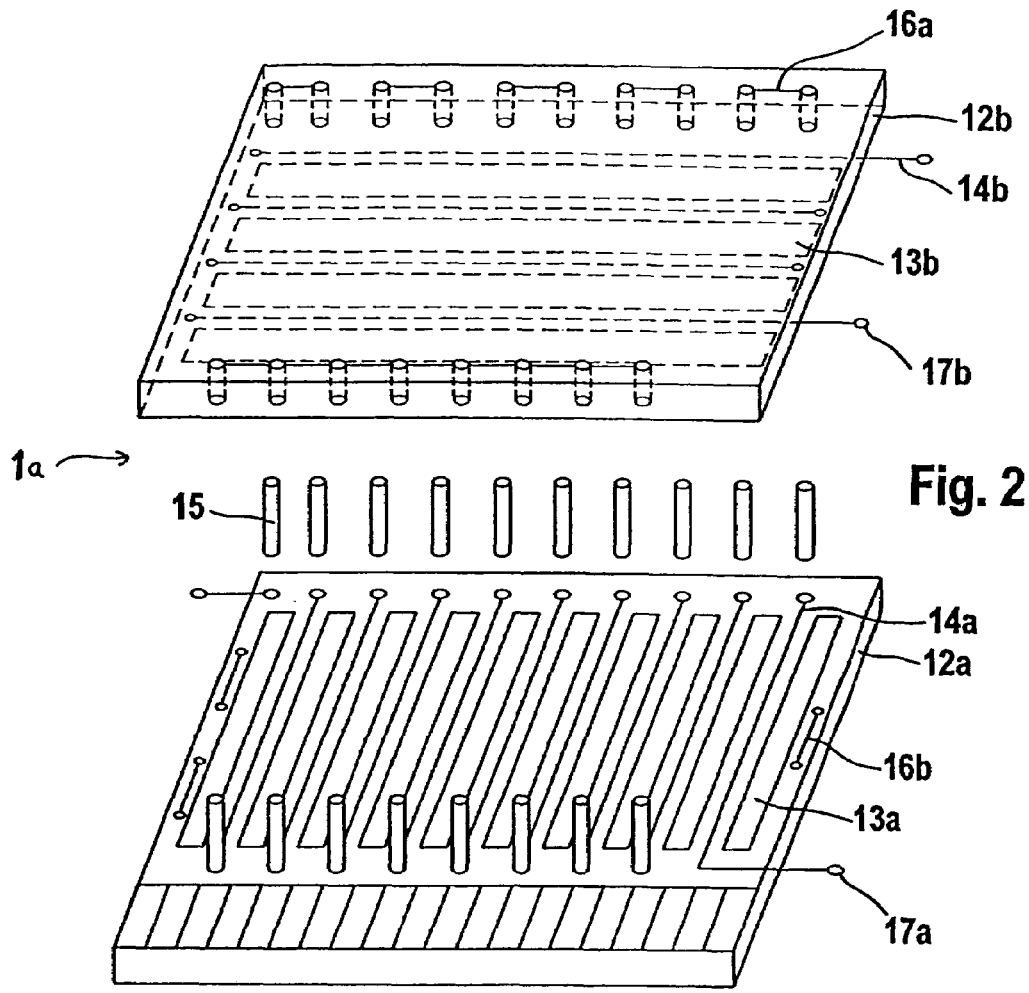
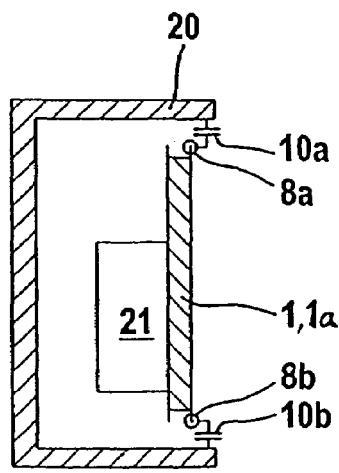

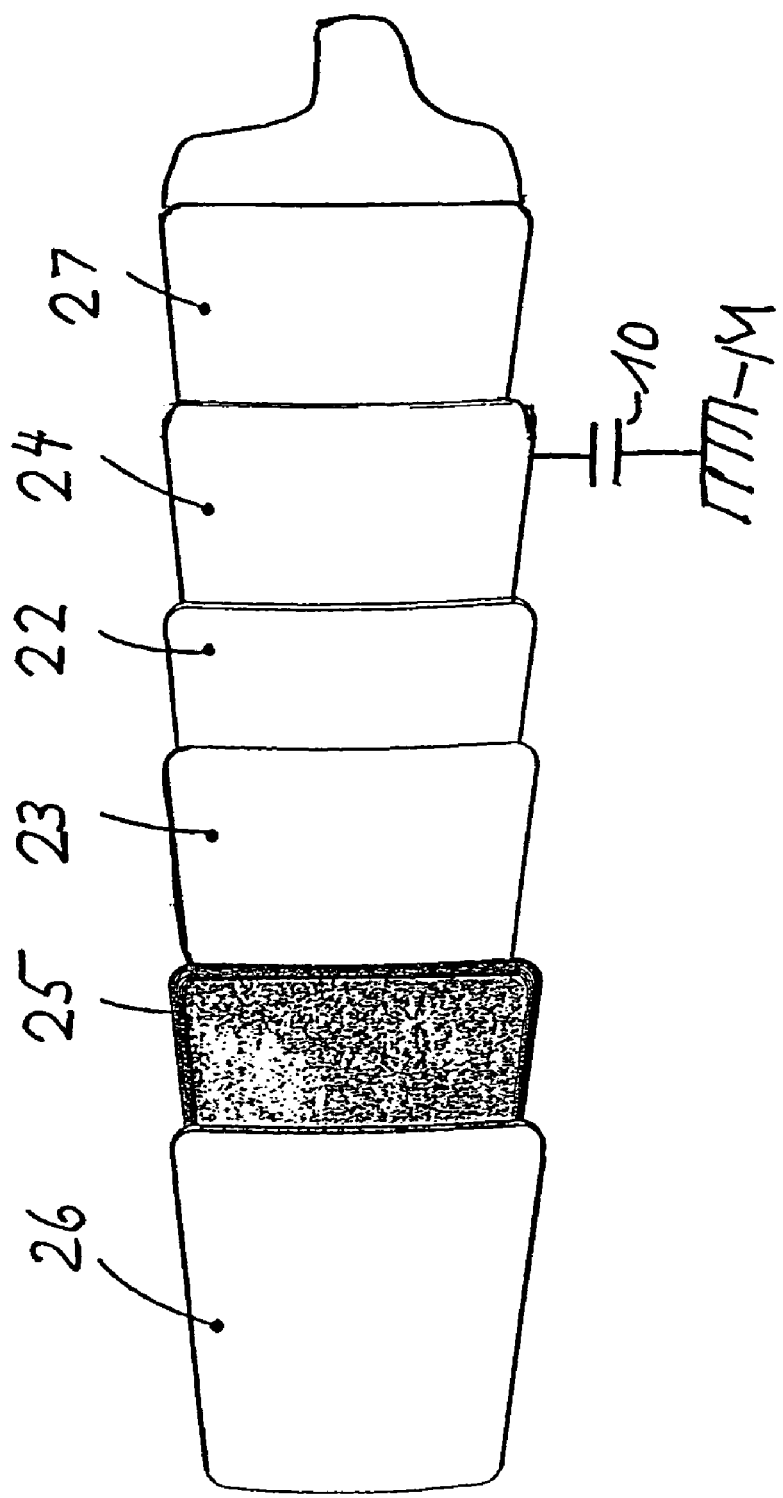

DISPLAY WITH AN ELECTRICALLY CONDUCTING LAYER

PRIORITY CLAIM

This is a U.S. national stage of application No. PCT/DE01/04811, filed on Dec. 20, 2001. Priority is claimed on that application and on the following application: Country: Germany, Application No.: 100 64 921.1, Filed: Dec. 23, 2000.

BACKGROUND OF THE INVENTION

1. Field of the Invention

The invention relates to a display for showing text and graphic images with an electrically conducting layer. Displays with an electrically conducting layer. Displays with an electrically conducting layer are known in the prior art and are used to make the display form a so-called "touch screen" or, for example in the case of liquid-crystal displays, to heat them. Heating devices are used in the case of liquid-crystal displays in order that they can operate quickly even at low temperatures, as may occur for example when they are used in motor vehicles, and in this way prevent a display with a slow response.

2. Description of the Prior Art

A "touch screen" is known in the prior art and is used to allow menus, submenus, values or icons represented on a screen to be selected by touching the respective representation with a finger or some other input means. In the case of an analog resistive touch screen, a plate of toughened glass with an electrically conductive coating with a uniform electrical resistance is arranged in front of the display. A sheet of polyester is stretched over this glass upper side and separated from it by small, transparent insulating points. The variable sheet has a hard, durable coating on the outer side and a conductive and highly transparent indium-tin-oxide coating on the inside. Even when touched lightly, the conductive coating establishes an electrical connection with the coating on the glass. By means of an integrated controller, a voltage gradient is set up on the conductive coating. The voltages at the contact point form an image of the touched position with the aid of analog values. The controller digitizes these voltages and sends them to a processing device to determine the touched positions.

A capacitive touch screen comprises a clear plate which has been coated with a resistively capacitive material and an insulating material. An electromagnetic field is generated over the plate. If a conducting object, for example a finger or metal rod, touches the screen and grounds it, the electromagnetic field changes. The place which was touched can be concluded from the change in the electromagnetic field.

Displays and the driver circuits controlling them are operated with high frequencies. Consequently, undesired electromagnetic disturbances can occur in the area surrounding the displays. If a display is used in an instrument cluster of a motor vehicle, the radio reception and/or the cell phone reception in the motor vehicle for example may be disturbed.

SUMMARY OF THE INVENTION

It is therefore the object of the invention to provide a display with an electrically conducting layer which causes the least possible electromagnetic disturbances and does not allow electromagnetic disturbances caused by the drive electronics to pass through and which is constructed in a simple and inexpensive way. This object is achieved according to the invention by the electrically conducting layer being connected to a shielding potential for high frequencies. The effect of this is that the electrically conducting layer is at the shielding potential for high frequencies and high frequencies are consequently prevented from passing through. The high-frequency connection may take place for example with capacitors which are arranged between the electrically conducting layer and the shielding potential, one terminal of the capacitor being connected to the electrically conducting layer and one terminal being connected to the shielding potential. In cases in which a DC connection between the electrically conducting layer and the shielding potential is unproblematical, it is also possible to establish the connection of the heating and the shielding potential by an electrically conductive element.

The shielding potential may be realized for example by a metal housing or by a metallized housing, the housing being closed by the display. Under some circumstances, depending on the required shielding effect, it may be adequate to connect the liquid-crystal display to a ground potential by a high-frequency connection.

The electrically conducting layer may be made up of indium-tin oxide (ITO), which covers the display over its surface area.

If the display is formed as a liquid-crystal display, the electrically conducting layer may be formed as a heating device, which is flowed through by a heating current. It is also possible to realize the heating device by means of current-conducting paths, which are arranged individually or in a meandering form. If these paths run between the electrodes of the liquid-crystal cells and consist of indium-tin oxide, they can be produced in one operation with the electrodes of the liquid-crystal cells.

It is also possible for the electrically conducting layer to be formed as part of a touch screen. In this case, the display may be formed for example as a liquid-crystal display, OLED display or as a monitor. If the display is formed as a liquid-crystal display, and an electrically conducting layer of a touch screen is arranged in front of it, the electrically conducting layer may also be used at the same time as heating for the liquid-crystal display.

BRIEF DESCRIPTION OF THE DRAWINGS

In the drawings, wherein like reference characters denote similar elements throughout the several views:

FIG. 2 is an exploded view of a front and rear walls of a liquid-crystal cell;

FIG. 3 is a sectional view through a liquid-crystal cell and a shielding housing; and FIG. 4 is an exploded view of a touch screen with a monitor.

DETAILED DESCRIPTION OF THE PRESENTLY PREFERRED EMBODIMENTS

Figure 1:
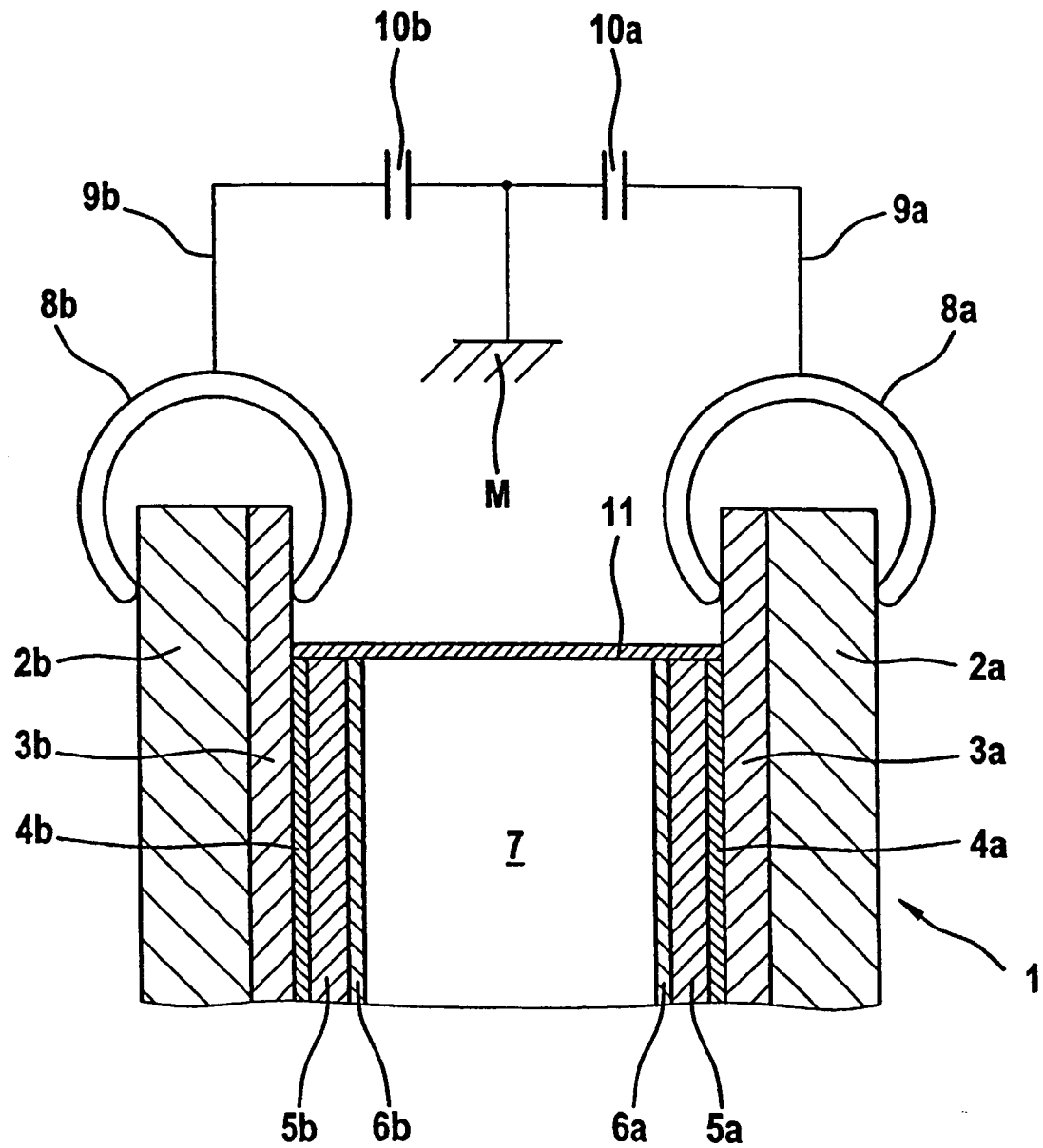
FIG. 1 is a partial sectional view of a liquid-crystal cell with heating applied over its surface area and the connection to a shielding potential.

In FIG. 1, a liquid-crystal cell 1 has a front wall 2a and a rear wall 2b. On the front wall 2a and the rear wall 2b, heating layers 3a, 3b have been respectively applied over their surface area and are respectively separated from front and rear electrodes 5a, 5b by insulations 4a, 4b. The front and rear electrodes 5a, 5b are finally separated from a liquid-crystal substance 7 by insulations 6a, 6b. The front and rear heating layers 3a, 3b are connected to a ground potential M via contact clips 8a, 8b, electrical conductors 9a, 9b, capacitors 10a, 10b. Consequently, high-frequency disturbances impinging on the heating layers 3a, 3b can be conducted via the contact clips 8a, 8b electrical conductors 9a, 9b capacitors 10a, 10b to the ground potential M.

An adhesive bond 11 connects the front wall 2a to the rear wall 2b and prevents any escape of the liquid-crystal substance 7.

The driving of the electrodes 5a, 5b for influencing the liquid-crystal substance 7 has long been known and is therefore not explained any further here.

In FIG. 2, a front wall 12a and a rear wall 12b of another liquid-crystal cell 1a can be seen. Arranged on the front wall 12a are electrodes 13a and arranged on the rear wall 12b are electrodes 13b. Arranged between the electrodes 13a of the front wall 12a are heating wires 14a, which are connected to one another via contact pins 15 and connections 16a arranged on the rear wall 12b and are consequently connected in series. Arranged between the electrodes 13b of the rear wall are heating wires 14b, which are likewise connected via contact pins (not represented) and connections 16b arranged on the front wall 12a and are consequently connected in series. The heating wires 14a, 14b are connected via terminals 17a, 17b to a shielding potential (not represented). The arrangement of the heating wires 14a, 14b at right angles in relation to one another produces an arrangement of the heating wires 14a, 14b in the overall form of a grid, so that, with a high-frequency connection to a shielding potential, high frequencies are prevented from passing through a display which has the components represented in FIG 2.

FIG. 3 shows a liquid-crystal cell 1 with a heating (not represented), which may be configured in the same way as the heatings of the liquid-crystal cells 1, 1a represented in FIG. 1 or 2. The heating device is electrically connected to a shielding housing 20 via contact clips 8a, 8b and capacitors 10a, 10b. The shielding housing 20 may be produced from metal or be coated with a metal. Consequently, the interior of the shielding housing 20 is largely isolated for high frequencies from the area surrounding the shielding housing. No disturbances can penetrate into the interior from outside. Similarly, disturbances which are caused by a driving circuit 21 also cannot get through to the outside and consequently disturb devices in the area surrounding the liquid-crystal cell 1, 1a.

In FIG 4, a monitor 27, a glass layer 22, transparent metal films 23, 24, an electron raster 25 and a glass layer 26 can be seen. The metal films 23, 5 24 have been vapor-deposited on the glass layer 22. The electron raster 25 has been vapor-deposited in the edge region on the metal film 23. The glass layer 2G has been applied to protect the touch screen. A low AC voltage is applied to the electron raster 25 at all four corners.

If the surface of the screen is then touched by a finger, the potential of the finger draws a tiny amount of charge from each corner point. Since the current flow from four corners of the touch screen is proportional to the distance between the corner and the point touched, the precise location at which the touch screen was touched can be calculated and consequently a menu or submenu represented in this region of the monitor, or the displayed value or icon can be selected. The metal film 24 is connected to the ground potential M via a capacitor 10. Consequently, high-frequency electromagnetic radiations of the monitor or of some other display present in place of the monitor 27 are shielded.

If a liquid-crystal display is used in place of the monitor 27, the metal film 24 may be used at the same time for heating the liquid-crystal display.

What is claimed is:

1. A display for showing text and graphical images, comprising:
    a liquid crystal display having a display surface and means for displaying the text and graphical images, said means comprising electrodes connected to a driving circuit;
    a terminal connected to a shielding potential;
    an electrically conducting layer covering said display surface area, said electrically conducting layer being separate from said electrodes, and
    a connection comprising a capacitance between said electrically conducting layer and said terminal connected to a shielding potential, said connection connecting high frequency signals on said electrically conducting layer to said shielding potential for at least one of shielding said display from external electromagnetic disturbances and preventing radiation from said display of electromagnetic disturbances generated by said means for displaying.

2. The display of claim 1, further comprising a capacitor providing said capacitance.

3. The display of claim 1, wherein said terminal connected to said shielding potential is connected to one of a metal housing and a metallized housing enclosed by said display.

4. The display of claim 1, wherein said shielding potential is a ground potential.

5. The display of claim 1, wherein said electrically conducting layer comprises indium-tin oxide.

6. The display of claim 1, wherein said electrically conducting layer comprises a heating device.

7. The display of claim 6, wherein said electrically conducting layer comprises current-conducting paths arranged on said liquid-crystal display.

8. The display of claim 7, wherein said liquid-crystal display comprises electrodes and said current-conducting paths are arranged between said electrodes.

9. The display of claim 7, wherein said currently conducting paths comprise indium-titanium oxide.

10. The display of claim 1, further comprising a touch screen, wherein said electrically conducting layer comprises a part of said touch screen.

11. The display of claim 10, wherein said electrically-conducting layer is also arranged for heating the liquid-crystal display.

12. The display of claim 1, wherein said means for displaying comprises a driver circuit controlling said display and said high frequency signals connected to said shielding potential are caused by said drive electronics, said connection preventing electromagnetic disturbances caused by radiation of said high frequency signals in an area surrounding said display.

* * * * *